(12) United States Patent
Fowlow

(10) Patent No.: US 7,660,883 B2
(45) Date of Patent: Feb. 9, 2010

(54) NETWORK MONITORING DEVICE

(75) Inventor: Bradley G. Fowlow, San Jose, CA (US)

(73) Assignee: Devicescape Software, Inc., San Bruno, CA (US)

( * ) Notice: Subject to any disclaimer, the term of this patent is extended or adjusted under 35 U.S.C. 154(b) by 454 days.

(21) Appl. No.: 11/481,237

(22) Filed: Jul. 3, 2006

(65) Prior Publication Data
US 2007/0014248 A1    Jan. 18, 2007

Related U.S. Application Data

(60) Provisional application No. 60/696,298, filed on Jul. 1, 2005.

(51) Int. Cl.
*G06F 15/173* (2006.01)
(52) U.S. Cl. .................. 709/223; 709/224; 714/15; 714/20
(58) Field of Classification Search ............. 709/224, 709/223; 714/26, 15, 20; 370/216, 241
See application file for complete search history.

(56) References Cited

U.S. PATENT DOCUMENTS

| | | | | |
|---|---|---|---|---|
| 5,430,709 A | * | 7/1995 | Galloway | 370/241 |
| 6,839,070 B2 | * | 1/2005 | Meandzija et al. | 715/736 |
| 7,131,032 B2 | * | 10/2006 | Gibson et al. | 714/26 |
| 7,197,561 B1 | * | 3/2007 | Lovy et al. | 709/224 |
| 7,496,660 B2 | * | 2/2009 | Blaisdell et al. | 709/224 |
| 2003/0018769 A1 | * | 1/2003 | Foulger et al. | 709/223 |
| 2004/0019676 A1 | * | 1/2004 | Iwatsuki et al. | 709/224 |
| 2006/0031466 A1 | * | 2/2006 | Kovach | 709/224 |

* cited by examiner

*Primary Examiner*—Krisna Lim
(74) *Attorney, Agent, or Firm*—Sheppard, Mullin, Richter & Hampton LLP

(57) ABSTRACT

A network monitoring system monitors a data network and enables observation of the data network state in the present or any arbitrary previous time. The system maintains an object-oriented network model that mirrors the state of network devices. A network data repository stores and maintains the network model. The network model retains a history of network events, enabling the system to reconstruct the state of all or a portion of the devices in the network at any previous time. The network data repository detects network devices on the data network to be monitored, communicates with network devices, monitors the state of network devices, receives and records network events, provides device and network state information to client applications, and manages data storage. Client applications can rewind and replay the history of the network model, allowing the observation of network devices and all of their state data at any prior time.

22 Claims, 7 Drawing Sheets

NETWORK MONITORING DEVICE

CROSS-REFERENCES TO RELATED APPLICATIONS

The present application claims the benefit of earlier filed provisional application U.S. Ser. No. 60/696,298, entitled "NETWORK MONITORING DEVICE", filed on Jul. 1, 2005, the entire content of which is incorporated herein by reference.

BACKGROUND OF THE INVENTION

This application relates to the field of software applications for analyzing, monitoring, and configuring data networks. Managing local or wide area data networks with hundreds or thousands of users is a challenging task. Users and computer systems are often constantly being added or removed from the data network. Additionally, even minor configuration changes, software upgrades, and equipment failures can dramatically impact the accessibility and functionality of all or large portions of the data network.

Wireless data networks, such as wireless local area networks implemented with the 802.11 networking standards, have become increasingly popular for enterprises. Wireless data networks enable users to connect with the data network anywhere within a network coverage area. Wireless data networks present unique management and monitoring challenges. Unlike wired network connections, wireless network connections frequently change over time. Wireless network users often connect and disconnect from the wireless data network. Additionally, wireless network users can roam over the network converage area, connecting with the wireless data network from different physical locations via different wireless access points. Radio interference can break or inhibit wireless network connections. Unauthorized stations and rogue access points can appear at unpredictable times. Moreover, wireless network connections are invisible, making physical inspection of the wireless network connection impossible.

Traditional network monitoring software applications often fail to meet the needs of network administrators. Many network monitoring software applications are capable of logging network events; however, it is difficult or impossible for administrators to deduce the state of the entire network from log data. Moreover, these network monitoring software applications often fail to provide a way to observe changes to the state of the data network over time.

Many network monitoring software applications are tailored to specific types or brands of networking equipment and little or no ability to monitor additional types of networking equipment. Furthermore, network monitoring software applications often have a fixed user interface that cannot be easily tailored to the needs of a specific data network.

Additionally, network monitoring software applications often lack specialized features, such as radio coverage analysis and rogue access point detection, required to effectively administrate wireless data networks. There are specialized applications that can provide these features for wireless data networks; however, these are often standalone applications that are not integrated with network monitoring software applications.

It is therefore desirable for a system and method to monitor a data network and enable observation of the state of the data network in the present time or any arbitrary previous time. It is further desirable for the system and method to be easily expanded to interface with different types of networking equipment. It is also desirable for the system and method to enable the implementation of custom user interfaces and visulizations of network data. It is also desirable for the system and method to provide monitoring, analysis, and configuration features adapted to wireless data networks.

BRIEF SUMMARY OF THE INVENTION

An embodiment of the invention includes a network monitoring system adapted to monitor a data network and enable observation of the state of the data network in the present time or any arbitrary previous time. The system maintains a object-oriented network model that mirrors the state of devices in the network. A network data repository stores and maintains the network model. The network model retains a history of network events, enabling the system to reconstruct the state of all or a portion of the devices in the network at any previous time. The network data repository detects network devices on the data network to be monitored, communicates with network devices, monitors the state of network devices, receives and records network events, provides device and network state information to client applications, and manages data storage. In an embodiment, communications between network devices and the system are facilitated through the use of a set of device models, each of which is a data object representing the state attributes of a particular type of network device and including one or more methods or functions adapted to interact with network devices of that type. Client applications enable the network administrators to rewind and replay the history of the network model, allowing network administrators to inspect network devices and all of their state data at any prior time.

In an embodiment, a method of determining a state of a network model representing at least a portion of a network includes receiving a new focal time for the network model, evaluating the new focal time with respect to a current focal time of the network model, selecting a keyframe of network data in response to a determination that there is at least one keyframe of network data having a time between the current focal time of the model and the new focal time, and modifying the state of the network model with the selected keyframe of network data and setting the current focal time of the network model to the time of the selected keyframe of network data in response to selecting the keyframe of network data. The method selects a set of network event data occuring between the current focal time of the network model and at least the new focal time and modifies the state of the network model with the selected set of network event data.

In a further embodiment, the current focal time is ahead of the new focal time and the keyframe of network data has a time prior to the new focal time. In another embodiment, the current focal time is behind the new focal time and the keyframe of network data has a time prior to the new focal time.

In an embodiment, the set of network event data includes at least one network state change event. The network state change event may include a code summarizing corresponding network data received from a network device. The code can specify a state attribute of the network model and a value for the attribute.

BRIEF DESCRIPTION OF THE DRAWINGS

The invention will be described with reference to the drawings, in which.

DETAILED DESCRIPTION OF THE INVENTION

Figure 1:
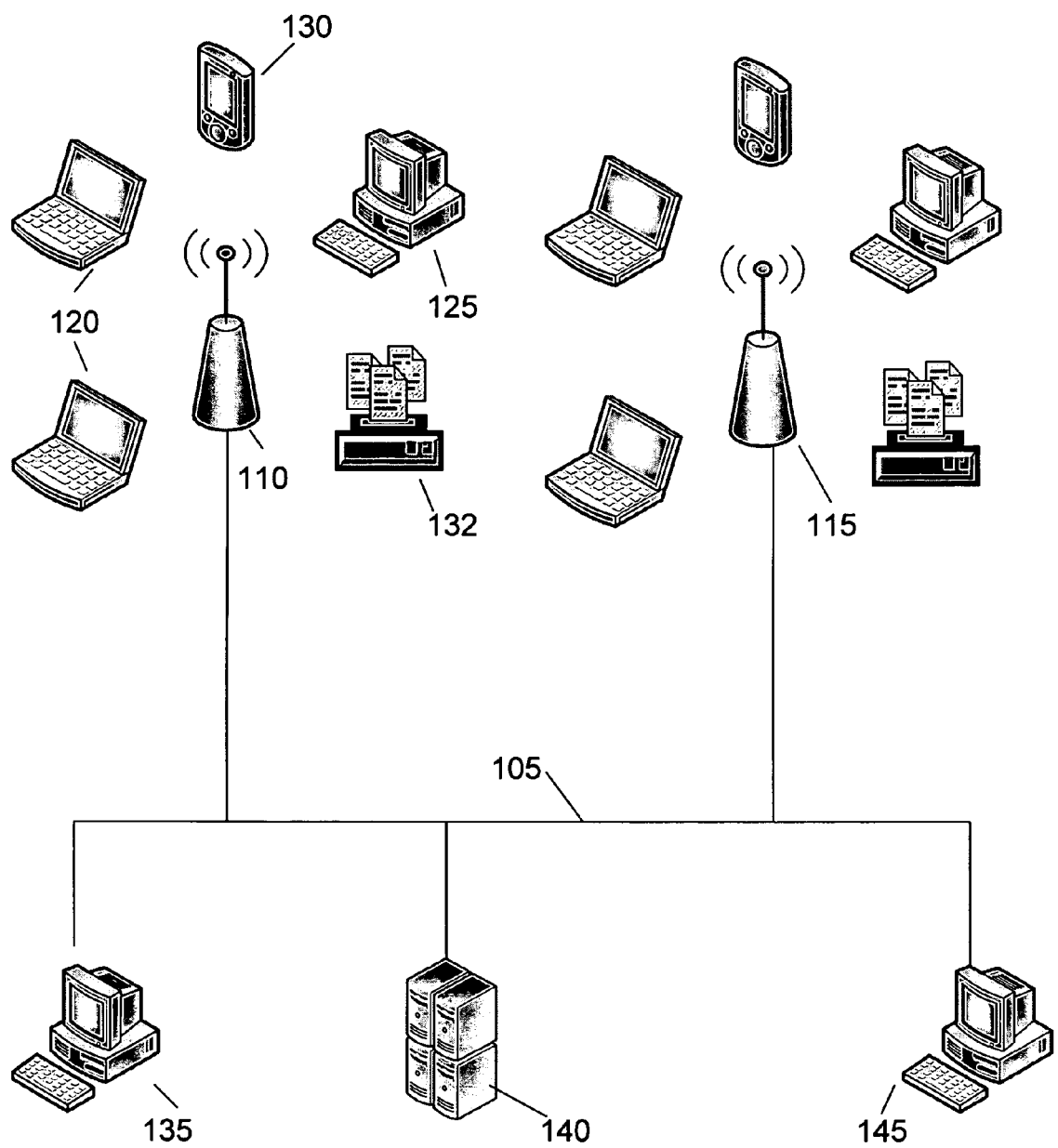
FIG. 1 illustrates an example data network suitable for use with an embodiment of the invention.

FIG. 1 illustrates an example data network 100 suitable for use with an embodiment of the invention. Data network 100 includes an electronic communications network 105 enabling communication between computers and other information processing devices. In an embodiment, electronic communications network 105 can include any form of electrical, radio, or optical communication devices, including wireless and wired networks. Electronic communications network 105 can also incorporate one or more local-area networks, such as an Ethernet network; wide-area networks, such as the Internet; and virtual networks, such as a virtual private network. Electronic communications network 105 can include any number of supporting communications devices adapted to carry or direct data traffic, such as hubs, switches, bridges, and routers.

Data network 100 includes one or more wireless access points, such as wireless access points 110 and 115. Wireless access points 110 and 115 can be stand-alone devices or integrated with other supporting communications devices, such hubs, switches, bridges, print servers, media servers, and/or routers. Wireless access points 110 and 115 provide wireless network connections using any means of wireless data communication, including any or all of the IEEE 802.11 set of wireless networking standards. Wireless access points 110 and 115 provide wireless network connections to one or more computers or other information processing devices. For example, wireless access point 110 provides wireless network connections to laptop computers 120, desktop computer 125, personal digital assistant device 130, and printer 132. Wireless access points 110 and 115 can provide wireless network connections to any type of device supporting a compatible wireless data communication system, including thin-client computers, Internet-enabled mobile telephones, video game consoles, digital audio or video recorders or players, and monitoring interfaces for industrial equipment.

In addition to devices connected via wireless network connections, data network 100 can include devices connected via wired networking connections. Examples of devices connected via wired networking connections can include additional computer systems 135 and 145 and server computer 140.

Figure 2:
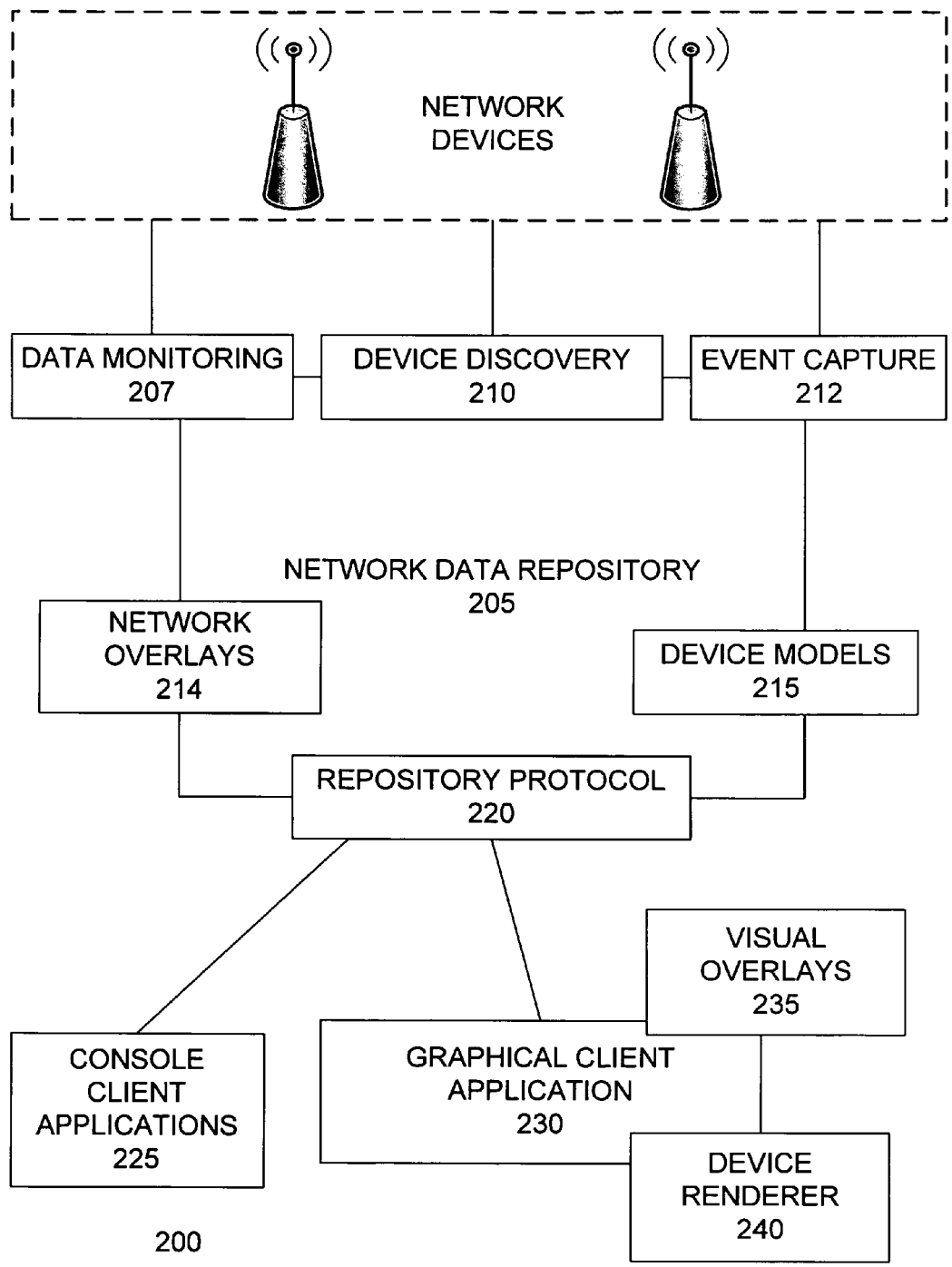
FIG. 2 illustrates a system for monitoring a data network according to an embodiment of the invention.

FIG. 2 illustrates a system 200 for monitoring a data network according to an embodiment of the invention. In an embodiment, system 200 maintains a object-oriented network model that mirrors the state of devices in the network. Using this network model, an embodiment of system 200 retains state information of devices in the network, enabling network administrators to reconstruct the state of all or a portion of the devices in the network at any previous time.

System 200 includes a network data repository 205. Network data repository 205 stores and maintains the network model. The network data repository 205 detects network devices on the data network to be monitored, communicates with network devices, monitors the state of network devices, receives and records network events, provides device and network state information to client applications, and manages data storage. In an embodiment, these tasks are facilitated through a plurality of modules interfaced with the network data repository 205.

In an embodiment, the network data repository 205 includes a device discovery module 210. The device discovery module 210 continually scans the data network for new devices that can be monitored and/or managed by system 200. In an embodiment, the device discovery module 210 scans one or more lists of known network address to locate network devices. In a further embodiment, the device discovery module 210 augments its list of known network addresses by communicating with all detected network devices to retreive additional neighboring network addresses known to these devices. Upon detecting a new network device, the device discovery module 210 instantiates a corresponding data object in the network model. Some network devices can be configured to respond to two or more network addresses. In a further embodiment, device discovery module 210 cross references all known network devices by MAC address or another unique identifier to prevent the creation of duplicate data objects in the network model.

In an embodiment, network data repository 205 includes data monitoring module 207. Data monitoring module 207 accesses network devices and retreives state data from them. The data monitoring module 207 updates the appropriate portions of the network model stored by network data repository 205. In an embodiment, network device state information includes management information base (MIB) data, such as that typically used in conjunction with the simple network management protocol (SNMP). The data monitoring module 207 can employ one or more standard protocols, such as SNMP, or proprietary, network device-specific, protocols to retrieve network device state data.

In an embodiment, data monitoring module 207 polls network devices periodically to retreive network device state data. In a further embodiment, the time intervals for polling netword device state data are specified according to a refresh policy. The refresh policy specifies a refresh rate for network devices and their attributes. The refresh policy can speciy the refresh rate in terms of a time interval between polling operations. In further embodiments, the refresh policy can specify the refresh rate in other terms, such as the occurance of an event triggering a polling operation for a network device. The refresh policy can specify different polling intervals for different network devices and for different attributes within a network device. For example, the refresh policy can specify that a first state attribute of a network device be polled every 30 seconds and that a second attribute of the network device be polled every hour. In a further embodiment, the refresh policy for each network device and its respective attributes can be inherited from a base refresh policy associated with all network devices of that type. In still further embodiments, network administrators can override refresh policies for one or more specific network devices.

In an embodiment, system 200 includes event capture module 212. Event capture module 212 sets one or more event traps. An event trap specifies a specific condition or event. The event trap is communicated to one or more network devices. In response to the condition of the event trap being satisfied, the network device transmits an event communication. The event capture module 212 monitors the data network for event communications from network devices and updates appropriate portions of the network model stored by the network data repository 205.

In an embodiment, communications between network devices and the data monitoring module 207, the device discovery module 210, and the event capture module 212 are facilitated through the use of a set of device models 215. Each device model 215 is a data object representing the state attributes of a particular type of network device. Additionally, each device model 215 includes one or more methods or functions adapted to interact with network devices of that type. For example, the methods of a device model 215 can be specifically tailored to a communicate with corresponding network devices using a standard or proprietary communications protocol. In a further embodiment, each device model 215 includes a refresh profile for corresponding network devices and its state attributes. In a further embodiment, device models can include methods specifying the visual display of state data of network devices.

The data monitoring module 207, the device discovery module 210, and the event capture module 212 can use device models to facilitate a number of different types of operations. For example, upon discovering a network device newly added to the data network, the device discovery module 210 can attempt to communicate with the network device using each of the available device models. If one of the data models 215 recognizes the network device and communicates with it successfully, then the device discovery module 210 has identified the type of the network device and can instantiate the appropriate type of data object in the network model. In a further embodiment, each network device on the data network is represented at least in part by an instance of a corresponding device model in the network model. An instance of a device model representing a network device in the network model can be referred to as a network element.

The data monitoring module 207 and the event capture module 212 can use the methods of a device model 215 to poll state data from network devices, to set event traps for network devices, and to convert state data from native formats to a common format used by the network model.

In a further embodiment, the set of device models 215 can be extended with additional device models to recognize the proprietary communications protocols and data formats, such as proprietary MIBs or other managed information regimes, of additional types, brands, models, and versions of network devices.

In an embodiment, the network data repository 205 includes network overlays 214. Network overlays 214 monitor and respond to network changes and events. Network overlays can also implement configuration and control tasks. Network overlays 214 can work with client applications adapted to provide user interface to the networok model.

In an embodiment, the network data repository 205 includes one or more repository protocols 220. The repository protocol 220 allows client applications to access the network model maintained by the network data repository 205. In additional embodiments, client applications can perform control and administration functions on the network model using the repository protocol 220. By examining and manipulating the software objects in the network model, client application can monitor the ongoing health and activity of network devices, receive event reports, and perform control and adminstration functions. In turn, the effects of these control and administration functions on the network model are propagated to their associated network devices.

System 200 includes several types of client applications. This includes console a client application 225 and a graphical client application 230. In an embodiment, a client application can retrieve a copy of the network model and examine and manipulate its respective data objects. The data available to the client via the network model can include the full collection of network devices managed by system 200, and all their state data; the group structure and layout properties of the network; the full history and state data changes of network devices, subject only to the configuration and storage capacity of system 200; and wireless users associated with network devices. In further embodiments, client applications can include the capability to rewind and replay the history of the network model, allowing network administrators to inspect network devices and all of their state data at any prior time.

Console client application 225 enables network administrators to access and manipulate the network model using a console and text-based interface. Graphical client application 230 presents network administrators with a visual representation of the network model, its network devices, and their respective state data. Graphical client application 230 can also include a graphical user interface. In a further embodiment, graphical client application 230 can interface with visual overlay modules 235 and/or device renderer modules 240. Visual overlay modules 235 provide additional data visualizations drawn over the network layouts and provide for the addition of per-device or per-session menu operations and custom user interface panels. Device renderer modules 240 create graphical representations of network devices and other portions of the network model. Different visual overlay 235 and device renderer 240 modules can be used to alter the appearance of the functionality and appearance of the graphical client application 230.

Figure 3:
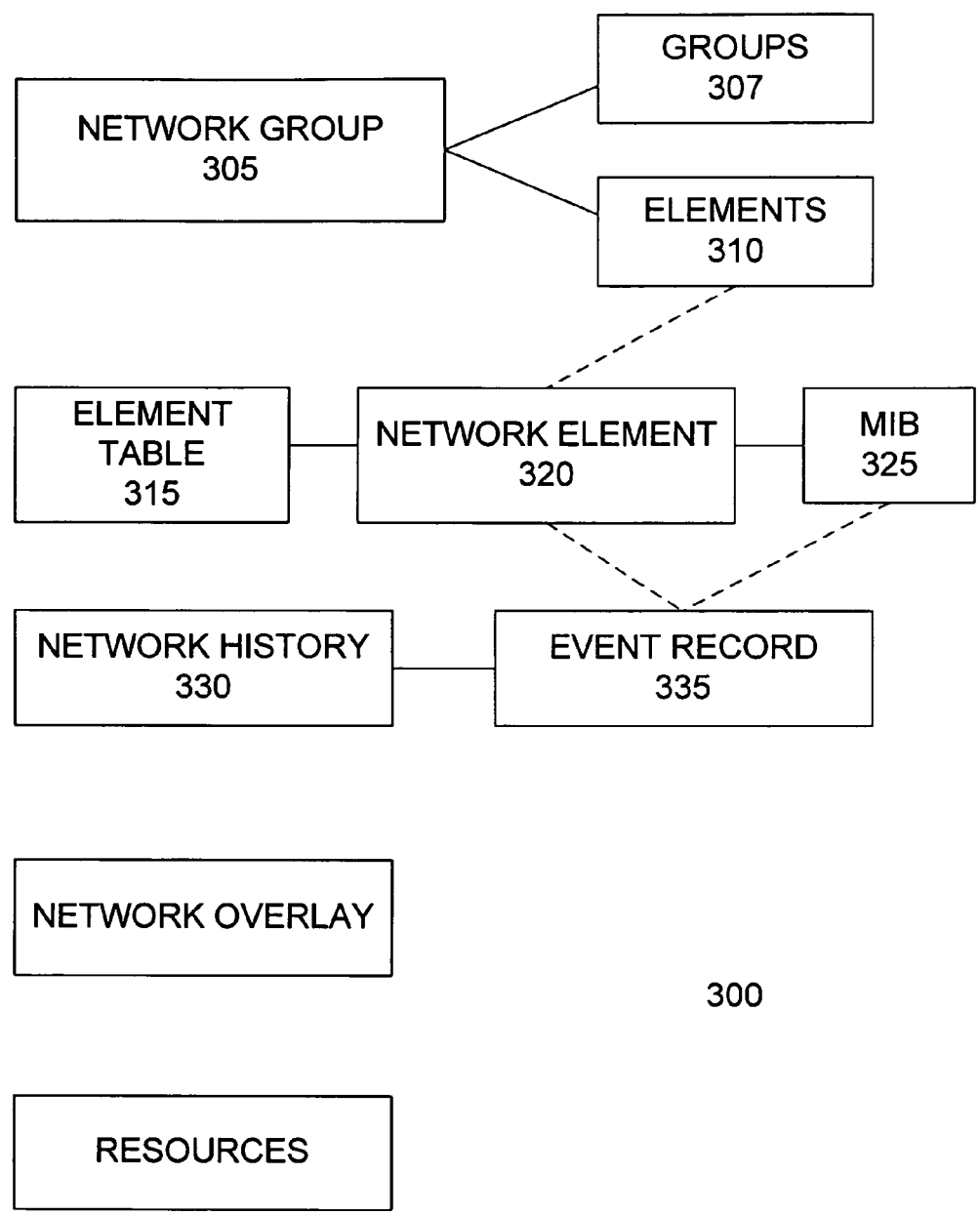
FIG. 3 illustrates a data model for representing states of a data network according to an embodiment of the invention.

FIG. 3 illustrates a network model 300 for representing states of a data network according to an embodiment of the invention. The network model 300 includes at least one network group object 305. Network group object 305 represents a set of connected network devices. Network group object 305 can include additional network group objects 307 representing subsets of network devices. The network group object 305 also includes a set of at least one network element object 310. In an embodiment, each network element object represents a network device and includes methods to access state data of the network device and to configure the operation of the network device.

Network element table 315 includes references to all of the network element objects in the network model, such as network element object 320. Network element object 320 is linked with the set of elements 310 of the network group 305. In an embodiment, state data of a network device that is represented by a network element object 320 is represented by MIB object 325. MIB object 325 represents the entire state of a network device at a given moment of time.

The state of network devices and hence the contents of corresponding MIB objects in the network model is changed by network received by event traps, polling network devices, and/or optional surveillance modules integrated with the network data repository. In an embodiment, state changes are represented in the network model by the network history object 330. The network history object 330 represents the entire recorded history of changes to the state of the network model. The network history object 330 includes one or more event record objects 335, each of which represent a single change to the state data of all or a portion of the network model. Each event record object 335 specifies a change to at least a portion of a MIB object 325 and the time at which this change was recorded by the network data repository.

As discussed above, some client applications enable the network administrators to rewind and replay the history of the network model, allowing network administrators to inspect network devices and all of their state data at any prior time. In an embodiment, each client application maintains a local copy of the network model 300, including the network history object 330. To reconstruct the state of the network model at a previous time, referred to as a focal time, an embodiment initializes the MIB objects 325 of the network model to a known initial state at an initial time prior to the focal time, and then replaying event record objects 335 occuring after that time to update one or more MIB objects 325 occurring up to the focal time. Once all of the event record objects 335 between the initial time and prior to the focal time have analyzed, the state of the MIB objects 325 represents the state of the network model at the focal time. In a further embodiment, changes to MIB objects 325 can propagate additional state changes to related objects.

Figure 4:
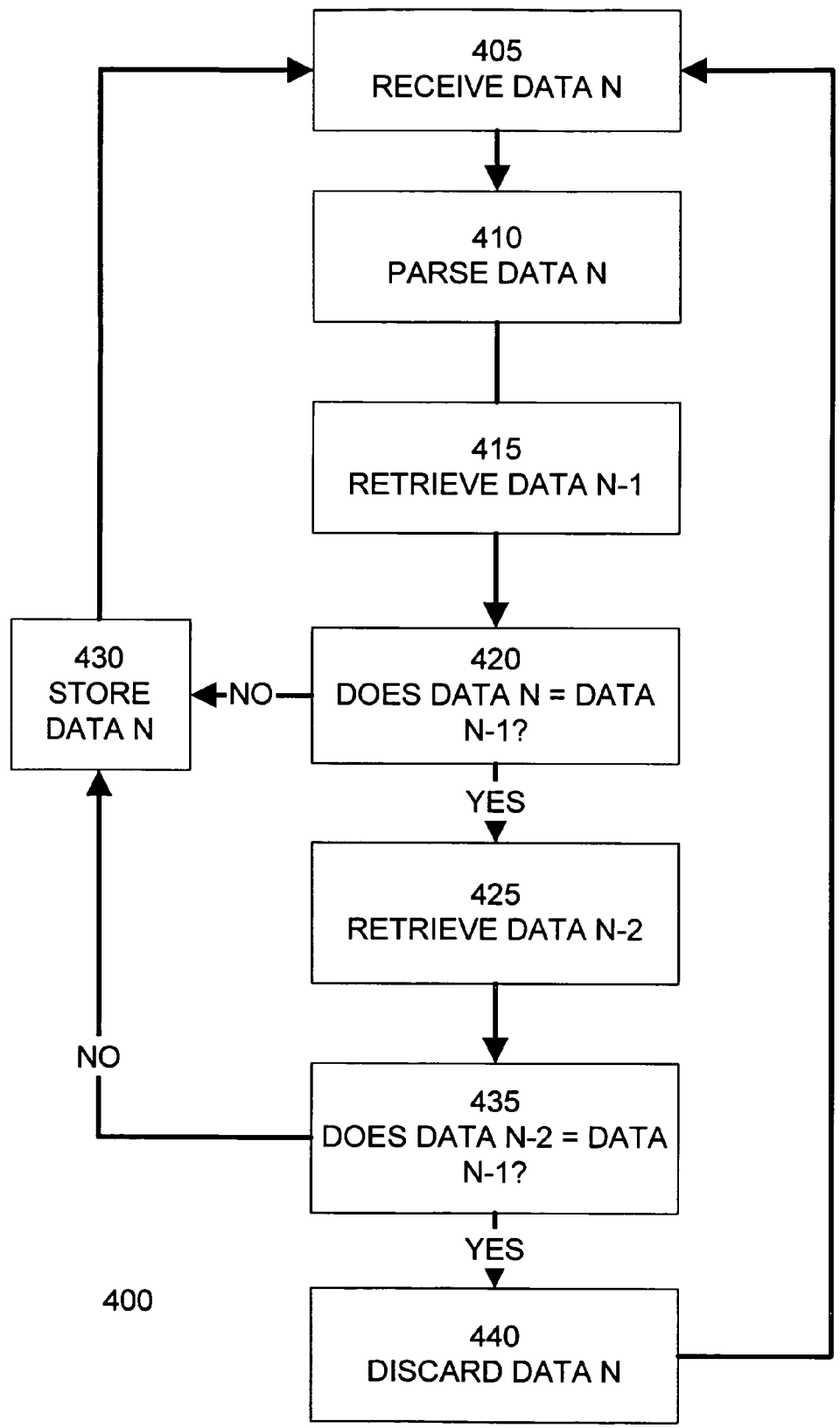
FIG. 4 illustrates a method for processing network state data according to an embodiment of the invention.

FIG. 4 illustrates a method 400 for processing network state data according to an embodiment of the invention. At step 405, network state data N is received by the network monitoring system. Network state data can be received via event traps, polling operations, or the actions of additional surveillance modules. Network state data N represents the state of at least one state attribute of at least one network device connected with the network monitoring system.

Step 410 parses the network state data N. Network state data is often provided in the form of long passages of text that is adapted to be read by users. To convert these passages of text into meaningful information in the network model, step 410 parses the network state data to identify the network device, the state attribute, and the attribute value changed by the network state data.

Because parsing network state data often involves applying complicated searching and pattern matching techniques to the text, a further embodiment of step 410 outputs a simplified state change code that compactly represents the state change specified by the network state data. During the replaying of event records to reconstruct a prior state of the network model, the state change code can be evaluated much faster than re-parsing the network state data. Thus, an embodiment of the invention stores the simplified state change code along with its corresponding network state data as received by the network monitoring system.

An example of the state change code output by an embodiment of step 410 can include a first parameter representing the kind of event and meaning associated with the network state data. Examples of this first parameter include data update or delete operations; wireless network user associations, disassociations, or roaming with a network device; and network interfaces starting, stopping, or activity.

Continuing with this example, the state change code can also include a second parameter identifying the state attribute modified by network state data N. In an embodiment, this can be representing as an index value specifying the storage location of the attribute in a table, array, or other data structure. Additionally, the state change code includes an attribute value specifying the new value, if any, of the state attribute.

Step 415 retreives network state data N−1 from the network data repository. Network state data N−1 is the most recent prior state data stored for the same state attribute as specified by the network state data N.

Step 420 compares the values of network state data N and N−1. If the value of network state data N is different than the value of network state data N−1, then step 430 stores network state data N in the network data repository. In an embodiment, step 430 includes instantiating an event record object with the value of network state data N and the time this data was received. In a further embodiment, the event record object also stores the value of a the code corresponding network state data N following the parsing of step 410.

If step 420 determines that the values of network state data N and N−1 are equal, step 425 retreives network state data N−2. Network state data N−2 is the most recent prior state data stored for the same state attribute as specified by the network state data N−1.

Step 435 compares the values of network state data N−1 and N−2. In an alternate embodiment, step 435 can compare the values of network state data N−2 and N. If the value of network state data N is different than the value of network state data N−1, then step 430 stores network state data N in the network data repository.

If step 435 determines that the values of network state data compared are the same, then step 440 discards network state data N and returns to step 405 to receive additional network state data. In an alternate embodiment, step 435 also compares the times associated with network state data N and N−1. If the time between when these two data values were received has exceeeded a threshold value, for example eight hours, then step 435 will proceed instead to step 430 to store network state data N.

Because method 400 only stores two consecutive unchanged state values and discards subsequently received network state data received that is unchanged, the storage requirements for method 400 are greatly reduced. By storing two consecutive and equal network state data values, the network monitoring system can more accurately store the rate of change of state attributes. Additionally, by storing network state data for a state attribute if there has been a sufficiently long time period following the storage of the most recent network state data for that attribute, method 400 reduces the number of events records that need to be replayed to reconstruct the state of the network model at any given focal time. Moreover, the use of codes to represent changes in state attributes reduces the processing time required to reconstruct a prior state of the network model and eliminates duplicative parsing.

Figure 5:
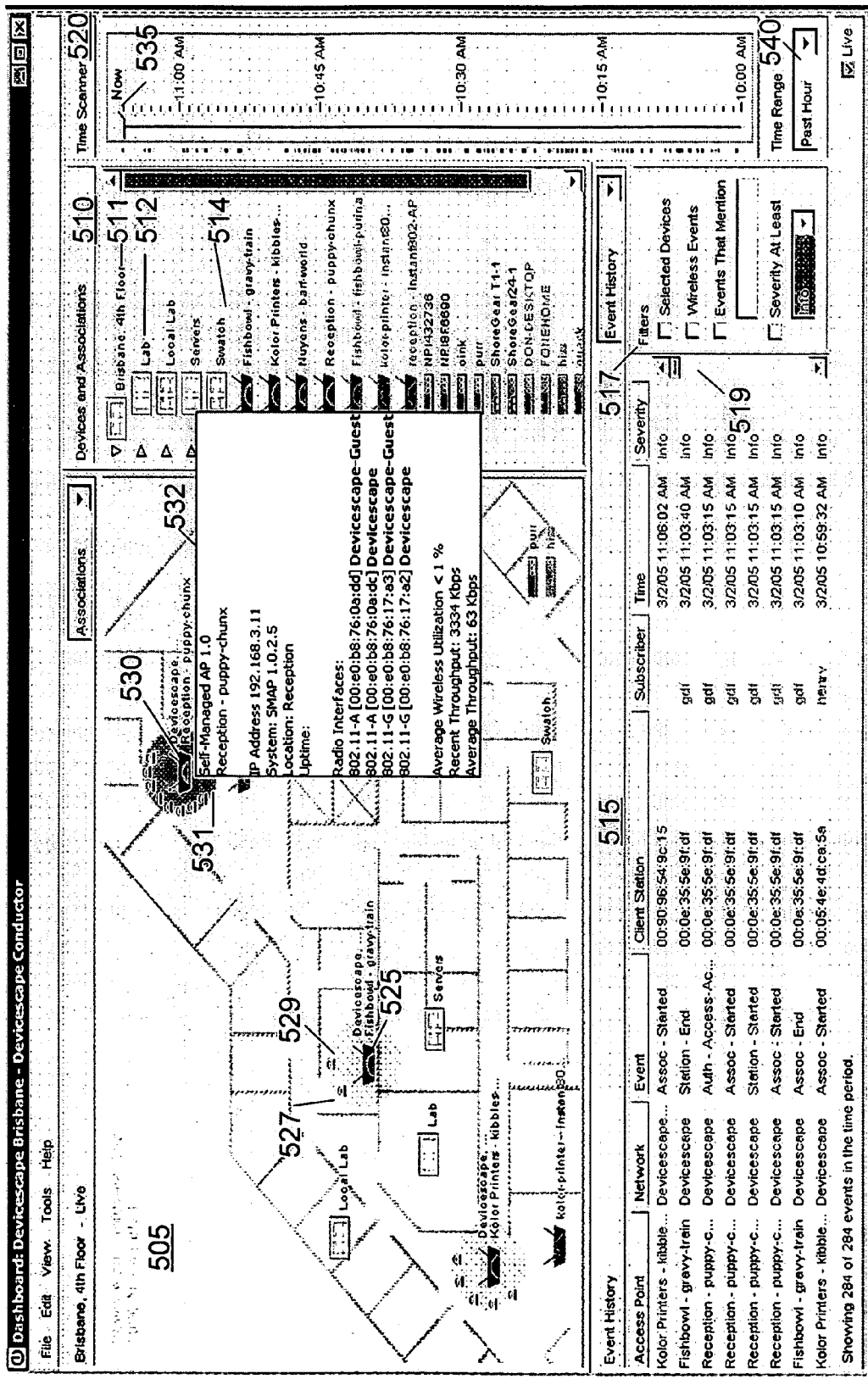
FIG. 5 illustrates an example screen display for a network monitoring client according to an embodiment of the invention.

FIG. 5 illustrates an example screen display 500 for a network monitoring client application according to an embodiment of the invention. Screen display 500 includes a main display area 505, a tree area 510, an event history window 515, and a time scanner control 520.

Tree area 510 presents a list of the network devices in the network model. The list in tree area 510 can arrange network devices hierarchically. Network administrators can rearrange network devices in the tree area 510, for example using drag and drop operations, to group related network devices together. Network devices in the tree area 510 can be grouped according to their type, their relationships, or their physical locations. Network administrators can initialize the list in tree area 510 by specifying one or more physical locations, such as location "Brisbane, 4th Floor," 511, and sub-locations "Lab," 512 and "Servers," 514, and then assigning network devices to the appropriate group.

Main display area 505 displays the physical location of network devices on a floorplan or other representation. In an embodiment, selecting a group in the tree area 510 displays the network devices and other attributes of the group in the main display area 505. In an embodiment, main display area 505 is initially configured by a network administrator to include a background image file representing a floorplan or other physical arrangement of at least a portion of the data network. The network administrator can then set the locations of network devices within the main display area 505 to correspond with their approximate physical locations.

Main display area 505 includes icons representing network devices in the group selected in the tree area 510. In an embodiment, an icon associated with a network device can include visual elements indicating the state of the network device. For example, icon 525 represents a wireless access point network device. Icon 525 includes sub-icons 527 and 529, each representing a wireless network connection being provided by the associated network device. As the number of wireless network connections change, similar sub-icons can be added or removed from icon 525. In a further embodiment, an icon 530 representing a wireless access point network device can include an indicator 531 that changes color or intensity to reflect the density of radio traffic or other attributes associated with the corresponding network device. In still further embodiments, pop-up menus and status displays, such as status display 532, provide additional information and functions for a network device corresponding with a selected icon in main display area 505.

Event display area 515 provides a table listing events associated with all or a portion of the network model. In an embodiment, filter controls 517 enable users to show or hide events matching specific criteria. In another embodiment, events are displayed in chronological order in event display area 515. Event display area 515 includes a scroll bar for scrolling through the list of events to view events at different times.

Time scanner control 520 enables network administrators to change the focal time of the network model being displayed. The time scanner control 520 functions as an interactive timeline for the network model. By manipulating the time scanner control 520, the network administrator can view the state of the network model at a previous time. The focal time is the time at which the network model is being viewed. The focal time ranges from the present moment 535 to the beginning of recorded time for the network model. A time range control 540 enables network administrators to change the scale of the time scanner control 520. In a further embodiment, the time scanner control 520 and the event display area 515 are linked, so that changes in the focal time in the timer scanner control 520 causes events at that focal time to be displayed in event display area 515.

As discussed above, client applications can include visual overlays and device renderer modules. In a further embodiment, these modules can be selected using association control 550 or other controls in the display 500 to change the presentation of the network model. Other visualizations can include three-dimensional views of the physical arrangement of the network model and data traffic patterns, graphs or charts displaying changes in state attributes over time, and different visual effects applied to icons representing network devices.

Figure 6:
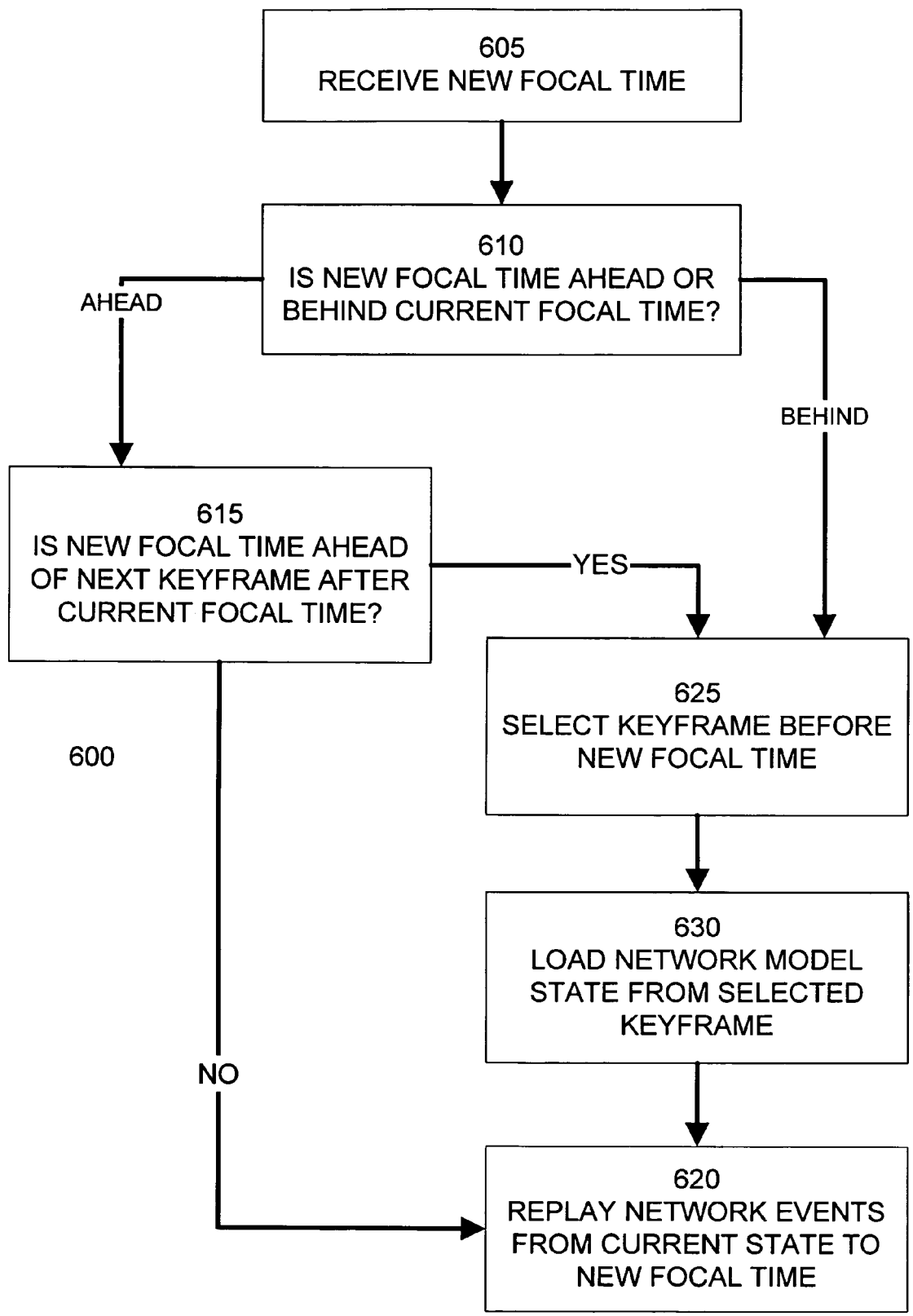
FIG. 6 illustrates a method of reconstructing the state of a data network at an arbitrary time according to an embodiment of the invention.

FIG. 6 illustrates a method 600 of reconstructing the state of a data network at an arbitrary time according to an embodiment of the invention. Method 600 can be used to determine the state of the network model at a previous time. Step 605 receives a new focal time for the network model. In an embodiment, step 605 can receive the new focal time from a network administrator via a time scanner control or other user interface element of a console or graphical client application.

Step 610 compares the new focal time received in step 605 with the current focal time of the network model. If the new focal time is ahead of the current focal time, method 600 proceeds to step 615. Step 615 determines if the new focal time is ahead of the next keyframe following the current focal time.

As discussed above, an embodiment of the system does not store a large number of network state data events for state data that is constant over time. However, if the value of a state attribute remains constant for a sufficiently long period of time, for example eight hours, a new network state event will be stored. The network state events stored after each of these time periods is referrred to as a keyframe. In an embodiment, the network state data of the keyframe is sufficient to reconstruct the state of all or a portion of the network model at the time of the keyframe without processing previous network state events. Thus, the network state data of the keyframe functions provides an absolute state of the network model at the time of the keyframe, rather than relative state changes as provided by other non-keyframe network state events.

Step 615 determines if there are any keyframes between the current focal time and the new focal time. If there are no intervening keyframes, method 600 proceeds from step 615 to step 620.

Step 620 replays network state change events from the current focal time up to and including the new focal time. In an embodiment, step 620 retreives a set of network state change events between the current focal time and the new focal time from the network data repository. Step 620 then applies the state changes specified by each state change event in chronological order to the network model. This has the effect of updating state attributes of the network model as if the events were being received. Following the application of all of the set of network state change events up to the new focal time, the state of the network model will be identical to the state of the data network at the time specified by the new focal time.

In a further embodiment, applying state change events to the network model is facilitated by the state change codes associated with state change events. As discussed above, the state change code compactly represents the state change specified by the network state change event. By updating the state of the network model using state change codes, step 620 avoids repeating the time-consuming parsing operations for each of the replayed network state change events.

Returning to step 610, if the new focal time is behind the current focus time, method 600 proceeds from step 610 to step 625. Similarly, if in step 615 there are one or more keyframes between the current focal time and the new focal time, method 600 proceeds from step 615 to step 625.

Regardless of how the method 600 arrives at step 625, step 625 selects the first keyframe prior to the new focus time. Step 630 retreives the network state data associated with the selected keyframe. As discussed above, the network state data of a keyframe provides the absolute state of the network model at the time of the keyframe. An embodiment of step 630 discards the current state data of the network model and replaces it with the network state data of the selected keyframe. Additionally, step 630 sets the current focal time of the network model to the time of the selected keyframe.

Following step 630, the state of the network model reflects the state of the corresponding data network at the time of the selected keyframe. Method 600 then proceeds to step 620. As before, step 620 replays additional network state change events from the current focal time, which in this case is now the time of the selected keyframe, up to and including the new focal time. Following the application of all of the set of network state change events up to the new focal time, the state of the network model will be identical to the state of the data network at the time specified by the new focal time.

In further embodiments of step 620, one or more filters can be applied to the set of network state change events so that only a specific portion of interest in the network model is updated. Step 620 can filter network state change events according to properties of the original network state data received or properties of their corresponding state change codes.

Figure 7:
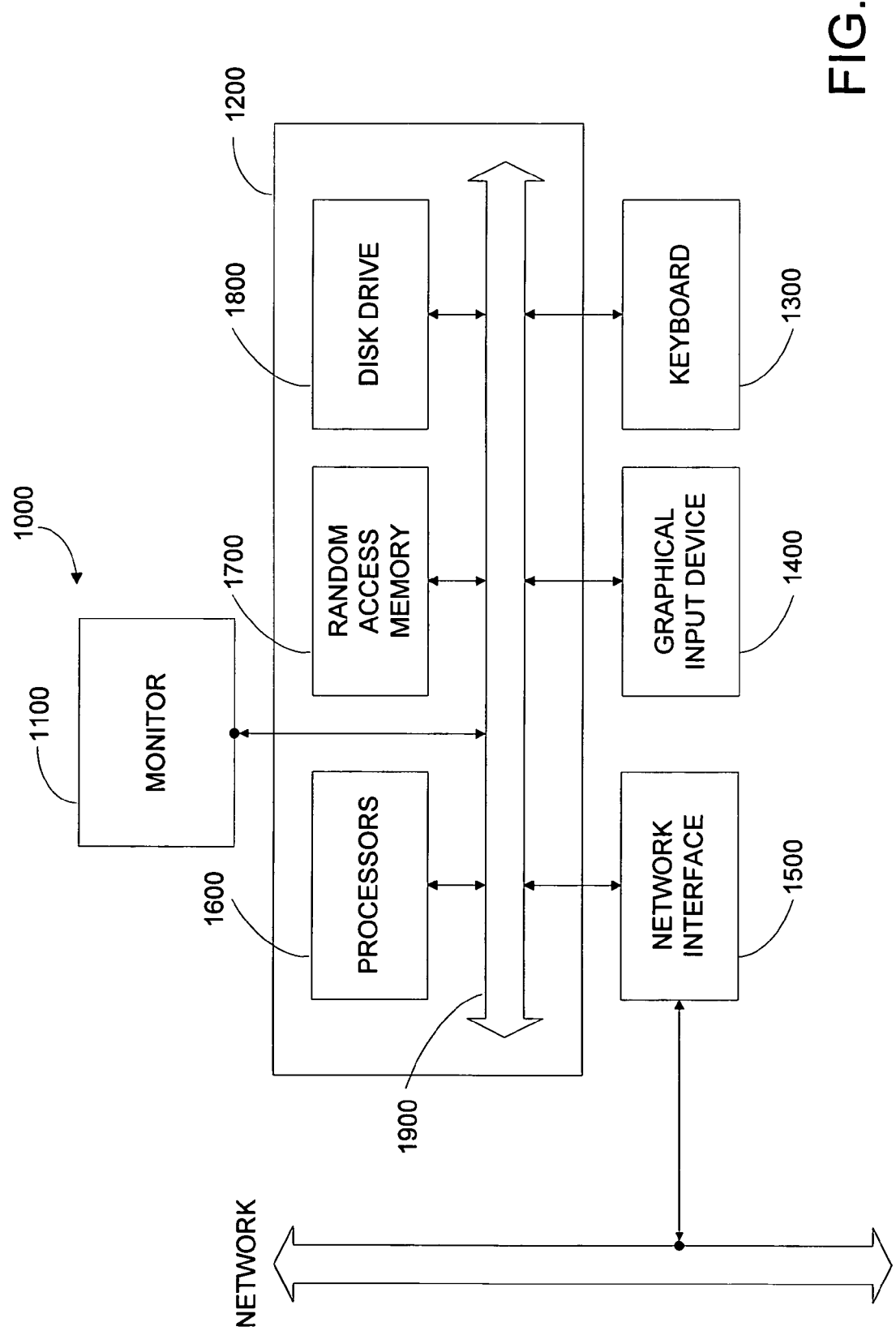
FIG. 7 illustrates a computer system suitable for implementing an embodiment of the invention.

FIG. 7 illustrates a computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, although the invention has been discussed with reference to wireless network devices, it is equally applicable to any type of network and network devices.

In other embodiments, combinations or sub-combinations of the above disclosed invention can be advantageously made. For example, portions of the network monitoring system may be integrated into networking devices. This allows a network device, such as a router or gateway, to monitor the state of a local area network without the need to install portions of the network monitoring system on computer systems in the network. This configuration is useful for network devices intended for use by computer novices. Network state data can then be retrieved and analyzed by a computer system including a client application connected with the network device via a local or wide-area network. This arrangement facilitates the diagnosis and maintenance of the network device and other connected network devices by local or remote network administrators on as needed basis with minimal additional cost or preplanning.

The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining a state of a network model representing at least a portion of a network, the method comprising:
    receiving a new focal time for the network model;
    evaluating the new focal time with respect to a current focal time of the network mode;
    selecting a keyframe of network data in response to a determination that there is at least one keyframe of network data having a time between the current focal time of the model and the new focal time, wherein the network data further includes a communication from an unidentified network device;
    modifying the state of the network model with the selected keyframe of network data and setting the current focal time of the network model to the time of the selected keyframe of network data in response to selecting the keyframe of network data;
    selecting a set of network event data occurring between the current focal time of the network model and at least the new focal time;
    modifying the state of the network model with the selected set of network event data;
    identifying a network address for the unidentified network device;
    selecting one of a plurality of device modules;
    attempting to communicate with the unidentified network device using the selected device module;
    determining if the attempt to communicate with the unidentified network device was successful; and
    repeating the identifying the network address, the selecting the one of the plurality of device modules, and the attempting to communicate with the unidentified network device for at least one additional device module in response to a determination that the attempt to communicate with the unidentified network device was not successful.

2. The method of claim 1, wherein the current focal time is ahead of the new focal time and the keyframe of network data has a time prior to the new focal time.

3. The method of claim 1, wherein the current focal time is behind the new focal time and the keyframe of network data has a time prior to the new focal time.

4. The method of claim 1, wherein the set of network event data includes at least one network state change event.

5. The method of claim 1, wherein the network state change event includes a code summarizing corresponding network data received from a network device.

6. The method of claim 5, wherein the code specifies a state attribute of the network model and a value for the attribute.

7. The method of claim 1, further comprising displaying a graphical representation of at least a portion of the state of the network model.

8. A method for storing a state of a network model representing at least a portion of a network, the method comprising:
    receiving network data from at least one network device, wherein the network data includes a communication from an unidentified network device;
    parsing the network data to determine a new state of at least a portion of the network model corresponding with the network device;
    comparing the new state with a first previously stored state;
    comparing the new state with a second previously stored state, wherein the second previously stored state was stored prior to the first previously stored state;

storing the new state in response to the determination that the new state is not equal to the first previously stored state;

storing the new state in response to the determination that the new state is equal to the first previously stored state and not equal to the second previously stored state;

discarding the new state in response to the determination that the new state is equal to the first and second previously stored state;

identifying a network address for the unidentified network device;

selecting one of a plurality of device modules;

attempting to communicate with the unidentified network device using the selected device module;

determining if the attempt to communicate with the unidentified network device was successful; and repeating the identifying the network address, the selecting the one of the plurality of device modules, and the attempting to communicate with the unidentified network device for at least one additional device module in response to a determination that the attempt to communicate with the unidentified network device was not successful.

9. The method of claim 8, wherein parsing the network data to determine a new state of at least a portion of the network model:

parsing the network data to identify at least a portion of the network model corresponding with the network device;

parsing the network data to identify at least one state attribute of the portion of the network model; and parsing the network data to identify a value of the state attribute.

10. The method of claim 9, further comprising: creating a code summarizing the effect of the network data on the network model.

11. The method of claim 10, wherein storing the new state includes storing the code.

12. The method of claim 8, further comprising: instantiating a new portion of the network model corresponding with the unidentified network device in response to a determination that the attempt to communicate with the unidentified network device was successful.

13. The method of claim 8, wherein the network data is received in response to polling at least one network device.

14. The method of claim 13, wherein the polling is conducted according to a refresh schedule associated with at least one network device.

15. The method of claim 8, wherein the network data is received in response to an event trap.

16. A system for monitoring states of a data network, the system comprising:

at least one module adapted to receive network data from at least one network device of the data network wherein the network data includes a communication from an unidentified network device, the at least one module adapted to (a) identify a network address for the unidentified network device;

(b) select one of a plurality of device modules;

(c) attempt to communicate with the unidentified network device using the selected device module;

(d) determine if the attempt to communicate with the unidentified network device was successful; and (e) repeat (b), (c), and (d) for at least one additional device module in response to a determination that the attempt to communicate with the unidentified network device was not successful;

a network data repository adapted to store at least the network data;

a network model capable of representing at least one state of the data network;

a graphical user interface adapted to display a graphical representation of the state of at least a portion of the network model and including a network time control adapted to specify a focal time of the network model;

wherein the system is adapted to respond to the network time control by reconstructing the state of the data network at the specified focal time from the network data in the network data repository.

17. The system of claim 16, wherein the graphical user interface includes a first display area presenting the physical locations of at least a portion of the network model.

18. The system of claim 17, wherein the first display area includes icons representing the state of network devices of at least the portion of the network model at the specified focal time.

19. The system of claim 18, wherein the icons include visual elements indicating state attributes of the network devices.

20. The system of claim 19, wherein the visual elements include an indicator of the number of wireless clients using each of the network devices.

21. The system of claim 19, wherein the visual elements include an indicator of the amount of data traffic associated with each of the network devices.

22. The system of claim 18, wherein the graphical user interface includes a second display area presenting network model state events at least at the specified focal time.

* * * * *